United States Patent [19]

Dinsmore

[11] Patent Number: 5,003,734
[45] Date of Patent: Apr. 2, 1991

[54] ANIMAL GUARD FOR POSTS

[76] Inventor: Howard Dinsmore, 11 Newbridge Rd., Brookfield, Conn. 06804

[21] Appl. No.: 424,918

[22] Filed: Oct. 23, 1989

[51] Int. Cl.$^5$ .............................................. E04B 1/72
[52] U.S. Cl. .................................. 52/101; 119/52.3; 119/57.9
[58] Field of Search ..................... 119/52.3, 57.9, 96, 119/903, 23; 47/23, 24, 25; 52/101

[56] References Cited

U.S. PATENT DOCUMENTS

| | | | |
|---|---|---|---|
| 3,590,780 | 7/1971 | Dunbar | 119/57.9 |
| 4,323,035 | 4/1982 | Piltch | 119/57.9 |

FOREIGN PATENT DOCUMENTS

| | | | |
|---|---|---|---|
| 2507058 | 12/1982 | France | 25/101 |
| 1036893 | 8/1983 | U.S.S.R. | 52/101 |
| 2194566 | 3/1988 | United Kingdom | 52/101 |

*Primary Examiner*—Robert P. Swiatek
*Assistant Examiner*—Todd E. Manahan
*Attorney, Agent, or Firm*—John H. Crozier

[57] ABSTRACT

In a preferred embodiment, an animal guard for posts or the like, which guard includes a vertical tube placed over the post. Extending outwardly from the tube are a plurality of longitudinal fins. The fins are spaced apart such that the distal edges of any two adjacent fins are too far apart for the animal to grasp and climb and the proximal edges of any two adjacent fins are too close together for the animal to be able to climb up the surface of the tube. The fins are too thin for the animal to be able to climb by grasping each side of the fin. The guard is especially effective in deterring squirrels from climbing posts.

4 Claims, 1 Drawing Sheet

ANIMAL GUARD FOR POSTS

BACKGROUND OF THE INVENTION

1. Field of the Invention

The present invention relates to animal guards generally and, more particularly, to a novel animal guard which is simple in construction and which is especially useful in preventing squirrels and other small animals from gaining access to post-mounted bird feeders or the like.

2. Background Art

Many small animals are known to disturb post-mounted bird feeders or the like. Access for such animals, once the bird feeder is located away from trees or structures which may offer a elevated path to the bird feeder, is by climbing the post on which the bird feeder is mounted and it is especially difficult to keep squirrels from climbing the posts. A number of attempts have been made in the past to obviate this problem, some of which are complicated and/or expensive, and many of which are not especially effective.

U.S. Pat. No. 1,286,416, issued Dec. 1, 1918, to Rix, describes an animal guard for trees which includes a large number of pointed spikes extending outwardly and downwardly from the trunk of a tree.

U.S. Pat. No. 1,420,243, issued June 20, 1922, to Cohen, is directed to a rat guard which may be placed over hawsers, anchor chains, posts, or the like and which consists of a pipe-like form which is clamped in place. When used with a hawser or anchor chain, a serrated member is formed along the upper side of the form to keep rats from climbing thereon.

U.S. Pat. No. 2,891,508, issued June 23, 1959, to Bower, is for a marauder guard for use on bird feeder posts which includes a rigid annular plate which is flexibly held in place so that the plate tips when an animal tries to gain a foothold on it and the animal, therefore, slips off.

U.S. Pat. No. 3,400,503, issued Sept. 10, 1968, to Schaller, covers means for protecting electrical transmission lines by providing a guard for each structural member of the support towers, which means includes a plurality of rows of sharp, toothlike projections along a section of each structural member.

U.S. Pat. No. 4,031,856, issued June 28, 1977, to Chester, describes a squirrel-proof post which has a counterweighted sleeve around the post. When a squirrel reaches the sleeve, it slides downward, the squirrel jumps off, and the sleeve returns to its upward position.

U.S. Pat. No. 4,523,546, issued June 18, 1985, to Latham, provides squirrel-proofing for a bird feeder of the type which is hung rather than being mounted on a post. Here, a flexible sheet is mounted above the bird feeder. When a squirrel tries to walk across the sheet to the edge thereof, the sheet flexes and the squirrel slides off without being able to grab onto the feeder.

Accordingly, it is a principal object of the present invention to provide an animal guard for posts or the like.

It is an additional object of the invention to provide such an animal guard that is particularly effective in keeping squirrels from gaining access to post-mounted bird feeders.

It is another object of the invention to provide such an animal guard that is simply and economically constructed.

Other objects of the present invention, as well as particular features and advantages thereof, will be elucidated in, or be apparent from, the following description and the accompanying drawing figures.

SUMMARY OF THE INVENTION

The present invention accomplishes the above objects, among others, by providing, in a preferred embodiment, an animal guard for posts or the like, which guard includes a vertical tube placed over the post. Extending outwardly from the tube are a plurality of longitudinal fins. The fins are spaced apart such that the distal edges of any two adjacent fins are too far apart for the animal to grasp and climb and the proximal edges of any two adjacent fins are too close together for the animal to be able to climb up the surface of the tube. The fins are too thin for the animal to be able to climb by grasping each side of the fin. The guard is especially effective in deterring squirrels from climbing posts.

DETAILED DESCRIPTION OF THE PREFERRED EMBODIMENTS

Figure 1:
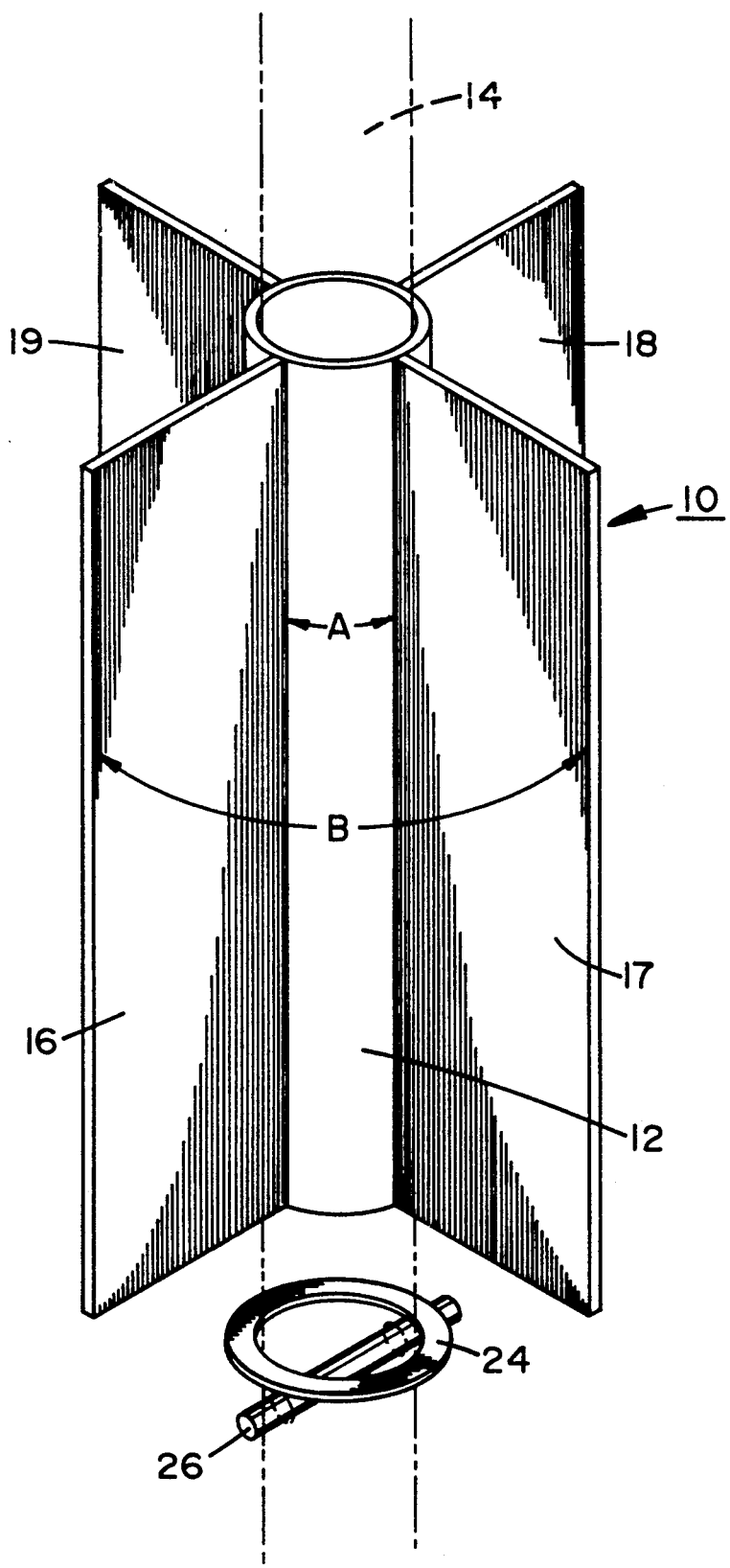
FIG. 1 is a partially exploded, perspective view of an animal guard according to the present invention.

Referring now to the Drawing, there is shown an animal guard according to the present invention, generally indicated by the reference numeral 10, which includes a center tube 12 disposed over a post 14. Four, equally spaced, longitudinal fins 16, 17, 18 and 19 extend outwardly from tube 12. Guard 10 is freely rotatably secured on post 14 by means of a washer 24 which is secured in place by means of a pin 26.

Typically an animal in climbing, such as a squirrel, must reach out to the left and right with its front and hind legs and grab a surface to exert a force from each side toward the center of its body, thereby creating opposing forces on the paws and claws for holding and climbing. Guard 10 thwarts the ability to grab hold in two places, therefore, the animal has no holding or climbing ability.

Fins 16–19 are spaced apart at their proximal edges so that the dimension of arc "A" is too small for the animal to be able to grasp and climb up the exposed area of tube 12. The distal edges of fins 16–19 are spaced apart at their distal edges so that the dimension of arc "B" is too great for the animal's legs to span the distal edges. Fins 16–19 are too thin for the animal to effectively grip the sides of any one of them for climbing.

Guard 10 is made to rotate freely around post 14 in order to prevent the broad sides of the fins from being used as a springboard to the base of the feeder. If guard 10 were fixed, the animal could conceivably bound up the post and use the fins to deflect off to the base of the feeder.

Any suitable material may be used for the construction of guard 10, provided that it is hard enough for the animals not to be able to insert their claws into it, and hard polymeric and metallic materials have been found to be the most desirable. For preventing squirrels from climbing post 14, guard 10 constructed with fins 16–19 sized 3"×12" each, of 8–10-gauge thickness, mounted on tube 12 sized 1⅜" I.D.×1⅝" O.D.×12" long has been found to be 100% effective.

Although having four fins has been found to be effective for squirrels, numbers of fins other than four may be employed, provided that the same effect can be achieved, and such is within the intent of the present invention.

It will thus be seen that the objects set forth above, among those made apparent from the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invnetion which, as a matter of language, might be said to fall therebetween.

I claim:

1. A guard to prevent an animal from climbing a post, comprising:
   (a) a central, elongated, hollow, body disposed vertically over said post; and
   (b) a plurality of longitudinal, vertical fins, having distal and proximal edges, attached to said body, said fins extending outwardly from the peripheral surface of said body.

2. A guard, as defined in claim 1, wherein the distal edges of any two adjacent said fins are spaced apart a distance selected such that said animal cannot span said distal edges with its paws for climbing.

3. A guard, as defined in claim 1, wherein the proximal edges of any two adjacent said fins are spaced apart on said peripheral surface a distance selected such that said animal cannot use said peripheral surface for climbing.

4. A guard, as defined in claim 1, wherein said guard is freely rotatably disposed on said post.

* * * * *